United States Patent
Lull et al.

(10) Patent No.: US 10,969,797 B2
(45) Date of Patent: Apr. 6, 2021

(54) MASS FLOW VALVE CONTROLLER AND CONTROL METHOD WITH SET POINT FILTER AND LINEARIZATION SYSTEM BASED ON VALVE MODEL

(71) Applicant: Illinois Tool Works Inc., Glenview, IL (US)

(72) Inventors: John Lull, Glenview, IL (US); Berwin Banares, Glenview, IL (US); Jeffrey Whiteley, Glenview, IL (US)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 63 days.

(21) Appl. No.: 16/116,786

(22) Filed: Aug. 29, 2018

(65) Prior Publication Data

US 2020/0073415 A1 Mar. 5, 2020

(51) Int. Cl.
 *G05D 7/06* (2006.01)
 *G05B 17/02* (2006.01)

(52) U.S. Cl.
 CPC ........... *G05D 7/0623* (2013.01); *G05B 17/02* (2013.01); *G05D 7/0635* (2013.01)

(58) Field of Classification Search
 None
 See application file for complete search history.

(56) References Cited

U.S. PATENT DOCUMENTS

| | | | | |
|---|---|---|---|---|
| 9,479,149 B1 * | 10/2016 | Augustin | ................. | H03K 5/12 |
| 2002/0114732 A1 * | 8/2002 | Vyers | .................... | G01F 1/6847 422/62 |
| 2002/0198668 A1 * | 12/2002 | Lull | ..................... | G01F 25/0007 702/45 |
| 2004/0074311 A1 * | 4/2004 | Lull | ........................ | G01F 15/024 73/861 |
| 2005/0288825 A1 * | 12/2005 | Tinsley | ................ | G05D 7/0635 700/282 |
| 2008/0140260 A1 * | 6/2008 | Ding | ........................ | G01F 1/68 700/282 |
| 2012/0197446 A1 * | 8/2012 | Glaudel | ............... | G05D 7/0635 700/282 |
| 2015/0039140 A1 * | 2/2015 | Ellec | .................... | G05D 7/0635 700/282 |

OTHER PUBLICATIONS

Boyd et al. 'A new device for highly accurate gas flow control with extremely fast response times' 2011 IEEE/SEMI Advanced Semiconductor Manufacturing Conference, Saratoga Springs, NY, 2011, pp. 1-5.*

* cited by examiner

Primary Examiner — Bernard G Lindsay
(74) Attorney, Agent, or Firm — McGuireWoods LLP

(57) ABSTRACT

A valve control system that includes a gain controller for controlling the linear response of a valve. The system includes a linearization control system coupled to the gain controller to determine a gain value to control the linear response time of the valve and a set point filter coupled to the linearization control system to filter a set point value. The linearization control system determines the gain value from the filtered set point value, at least one real-time fluid parameter value, valve model data, an actuator gain, and a valve model gain.

19 Claims, 6 Drawing Sheets

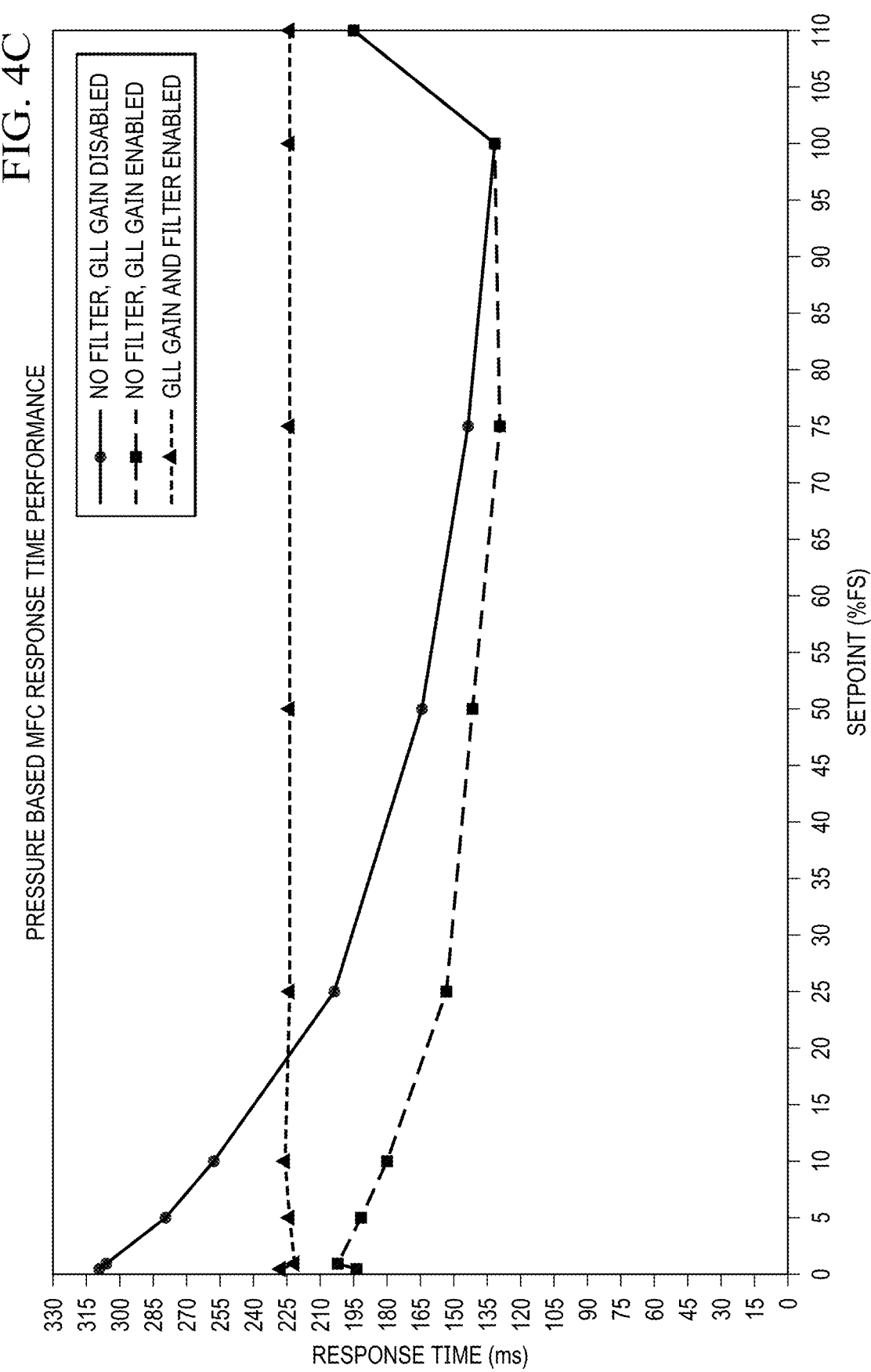

ical Field of the Disclosure

MASS FLOW VALVE CONTROLLER AND CONTROL METHOD WITH SET POINT FILTER AND LINEARIZATION SYSTEM BASED ON VALVE MODEL

TECHNICAL FIELD OF THE DISCLOSURE

The present disclosure relates, in general, to Mass Flow Controllers (MFC) for controlling the flow of fluid through a flow path and, in particular, to an MFC, controller algorithm, and set point filter for controlling the gain of the mass flow controller by controlling the linear response of a mass flow controller valve.

BACKGROUND

An MFC is a device for controlling the flow of fluid through a flow path based on a desired flow rate and real-time feedback measurements of measured temperature, pressure, and flow rate of the fluid. In order to control this process and maintain the desired flow rate the mass flow controller electro-mechanically controls opening and closing of a valve to achieve the desired flow rates according to the feedback measurements. Currently, available MFC's lack the sophistication necessary to maintain the finite level of control necessary to constantly and continuously maintain the desired flow rate without the introduction of noise into the system due to various non-linear artifacts.

SUMMARY

In an embodiment, a valve control system for controlling operation of a valve is presented. The valve control system includes a gain controller for sending a drive value to a valve actuator to control linear response time of a valve and a linearization control system coupled with the gain controller to determine a gain value to control the linear response time of the valve. The valve control system also includes a set point filter coupled to the linearization control system to filter a set point value; wherein the linearization control system determines the gain value from the filtered set point value, at least one real-time fluid parameter value, valve model data, an actuator gain, and a valve model gain.

In yet another embodiment, a method for controlling operation of a valve is presented. The method includes sending, at a gain controller, a drive value to a valve actuator to control linear response time of a valve; determining, at a linearization control system coupled with the gain controller, a gain value to control the linear response time of the valve; and filtering, at a set point filter coupled to the linearization control system, a set point value, wherein the linearization control system determines the gain value from the filtered set point value, at least one real-time fluid parameter value, valve model data, an actuator gain, and a valve model gain.

In yet still another embodiment, a control system for controlling valve response time of a valve based system is presented. The control system includes a feedback control system coupled to an actuator of the valve based system to determine a gain value to control the linear response time of a valve; and a set point filter coupled to the gain control system to filter a set point value; wherein the linearization control system determines the gain value from the filtered set point value, at least one real-time fluid parameter value, valve model data, an actuator gain, and a valve model gain.

In the embodiments, the set point filter includes a slew-rate limiting filter and a low pass filter; at least one real-time fluid parameter value is selected from the group comprising fluid pressure, fluid type, and fluid temperature; the gain value is defined by $dY/dx = f'(g(x))g'(x)$, where Y is controller drive, $f'(g(x))$ is actuator gain, and $g'(x)$ is the valve model gain; the linear response time is less than 300 ms and an output response is within 98% of the set point value; and the gain is equal to the reciprocal of a feedback signal indicating fluid flow and an output of the gain controller.

Additional embodiments, advantages, and novel features are set forth in the detailed description.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 4C is an illustration of a performance graph of pressure based MFC response times versus set point values for different controller system settings.

DETAILED DESCRIPTION

Figure 1:
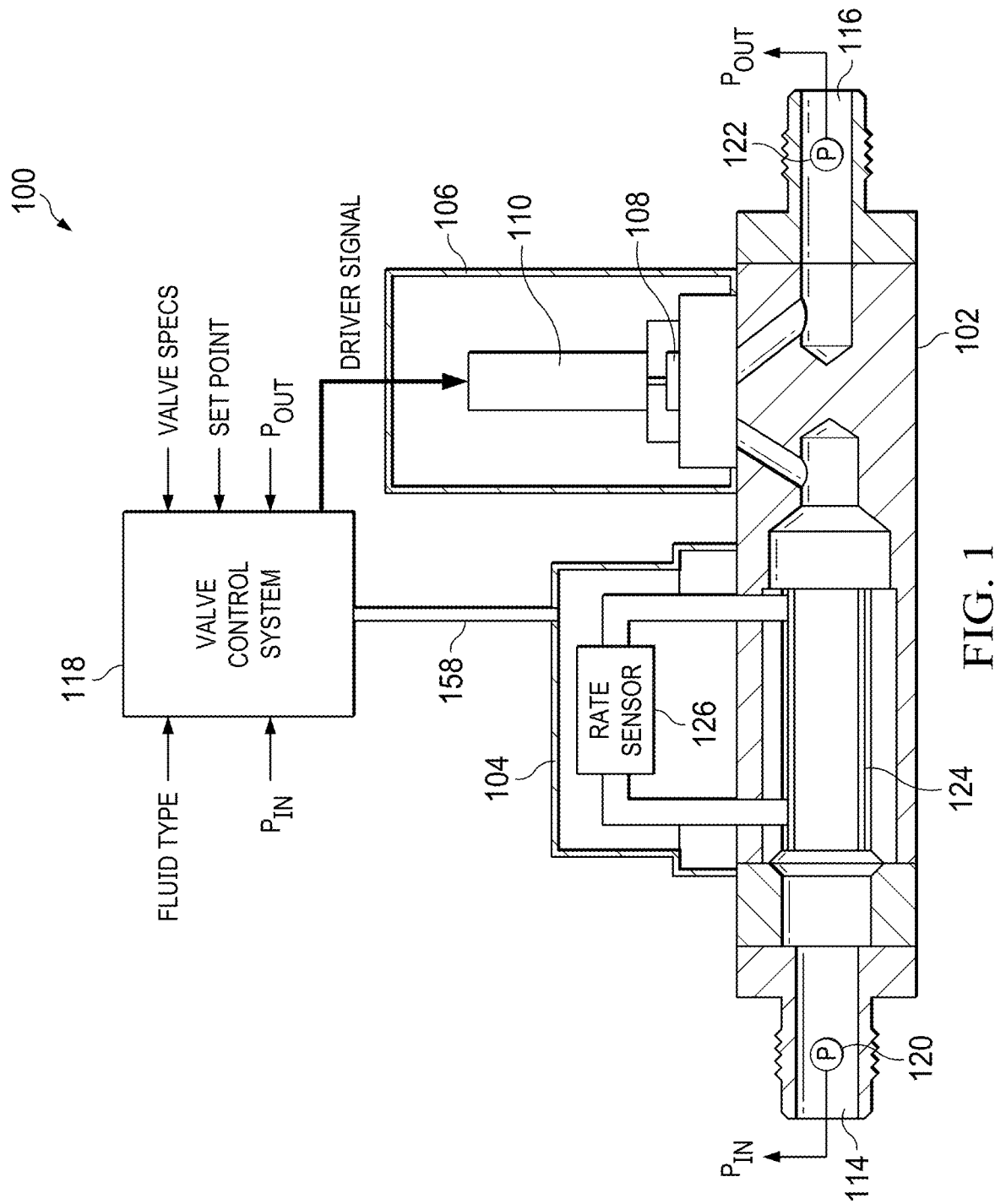
FIG. 1 is an illustration of a block diagram of an MFC, in accordance with certain example embodiments.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

The MFC and controlling algorithms presented herein have many practical applications, e.g. the MFC and control algorithms provide significant advantages when used in the semiconductor processing field. The control algorithms provide advantages over traditional MFC's, e.g., by implementing control algorithms that achieve fast, precise, and consistent transient response characteristics over an entire control range and under all operating conditions. The control algorithms presented here include a flow control algorithm, a flow modeling algorithm, and a valve modeling algorithm that together can significantly improve MFC operations by providing precise linear response control of the MFC's valve operations. Furthermore, set point control command input filtering can add stability and consistency to control unwanted non-linear transient responses.

The controls algorithms can be completely self-contained within the MFC. An advantage of such is that fluid properties can be modeled in real-time as different fluid types are configured, and as actual temperatures, pressures, and flow rates change. Another advantage of such is that fluid properties provided by the flow modeling algorithm can be used to establish a relationship between required valve opening for the desired flow rate and the drive signal needed to achieve that flow. The flow control algorithm described herein can be a GLL, Gain-Lead-Lag controller, a form of PID controller, which incorporates a variable and dynamic gain input, hereafter referred to as GLL Gain, for linearizing the plant gain of the system, which is the derivative of the feedback signal with respect to the output of the controller. An alternative method of performing non real-time GLL gain calculations is to use off-line 2-dimensional tables and external software. Undesirable attributes of this implementation are that the GLL Gain table generation is based on a pre-defined pressure range and temperature rather than actual temperature and pressure, a 2-dimensional gain table requires a large amount of storage, and creation of the table can be time consuming.

The flow modeling algorithm and a valve modeling algorithm implemented in the MFC firmware provides significant advantages. E.g., GLL gain calculations can be performed on each processing cycle. There is no need for table generation. The valve modeling algorithm can process in real-time the pressure, temperature, and fluid rates and, as such, the flow for different fluid types can be managed more accurately. GLL gain essentially is the amount of drive change required for a given change in flow. GLL gain can be expressed as 1/(dFlow/dDrive) or simply dDrive/dFlow. Since GLL gain can be expressed as dDrive/dFlow, the relationship of drive to flow can be determined. Using the valve modeling algorithm, lift from flow can be determined and vice versa, as will be discussed in greater detail below.

Furthermore, due to the fast response time of the pressure transducers, it is possible to specify transient flow control response times to a tighter tolerance. For example, the transient flow response times can be controlled within 200 ms+/−10 ms. This is a significant improvement over traditional systems. This can be accomplished using various filtering functions on the flow controller command input. Another advantage of command filtering is that the GLL controller now only needs to control with small errors between the command input and the process variable, so it is possible to tune the GLL controller to be more responsive without compromising stability. Without command filtering, any change in command input presents the GLL controller with a large and instantaneous error. Yet another advantage is to provide a means to easily provide tiered response times with very little time and effort. Traditionally, when a tighter transient response time tolerance was required, or a faster transient response time in general, significant time and effort was usually required to refine the multitude of tuning parameters to obtain the desired results. With command filtering this can be accomplished quickly and easily by adjusting a single attribute in most cases.

Referring now to FIG. 1, illustrated is a block diagram of an MFC, in accordance with certain example embodiments, denoted generally as 100. MFC 100 can include a step 102, a mass flow meter 104, and a valve assembly 106 containing a valve 108 and actuator 110, all of which can be mounted on the step 102 between a fluid inlet 114 and a fluid outlet 116. The MFC 100 can further include a valve control system 118 communicable coupled between the mass flow meter 104 and the valve assembly 106. In addition, the mass flow controller 100 can include inlet and outlet pressure transducers 120, 122 coupled to the flow path at an upstream and downstream position and communicable coupled with the valve control system 118. The mass flow meter 104 can include a bypass channel 124 through which fluid flows and another channel with a flow rate sensor 126 through which a smaller portion of the fluid flows. In addition, the mass flow controller 100 can use a thermal mass flow sensor to measure temperature and flow rate, although other sensor types can be used including a Coriolis-based sensor and a differential pressure sensor. The Coriolis-based sensor being capable of determining mass flow independent of temperature, flow profile, density, viscosity, and homogeneity.

In practice, as fluid flows past the pressure transducers 120 and 122 and the flow rate sensor 126, real-time pressure data, flow rate data, and temperature data can be provided to valve control system 118. The flow rate of the fluid can be sensitive and a number of operating conditions including fluid type, inlet and outlet pressure, temperature, flow rate set point value, and valve operating characteristics all can affect the fluid flow rate, i.e. cause a deviation in the rate from a desired set rate. The valve control system 118 can control operation of the valve 10 in real-time by providing an error-correcting drive signal to the valve actuator 110 causing an adjustment to the valve 108 and to the flow rate based on the fluid type, inlet and outlet pressure transducer readings, a flow rate set point value, and valve specifications in order to control the operation of the valve 108. Feedback control methods, such as proportional control, integral control, proportional-integral (PI) control, derivative control, proportional-derivative (PD) control, integral-derivative (ID) control, and proportional-integral-derivative (PID) control, can be used to control the flow of fluid in the mass flow controller.

Figure 2:
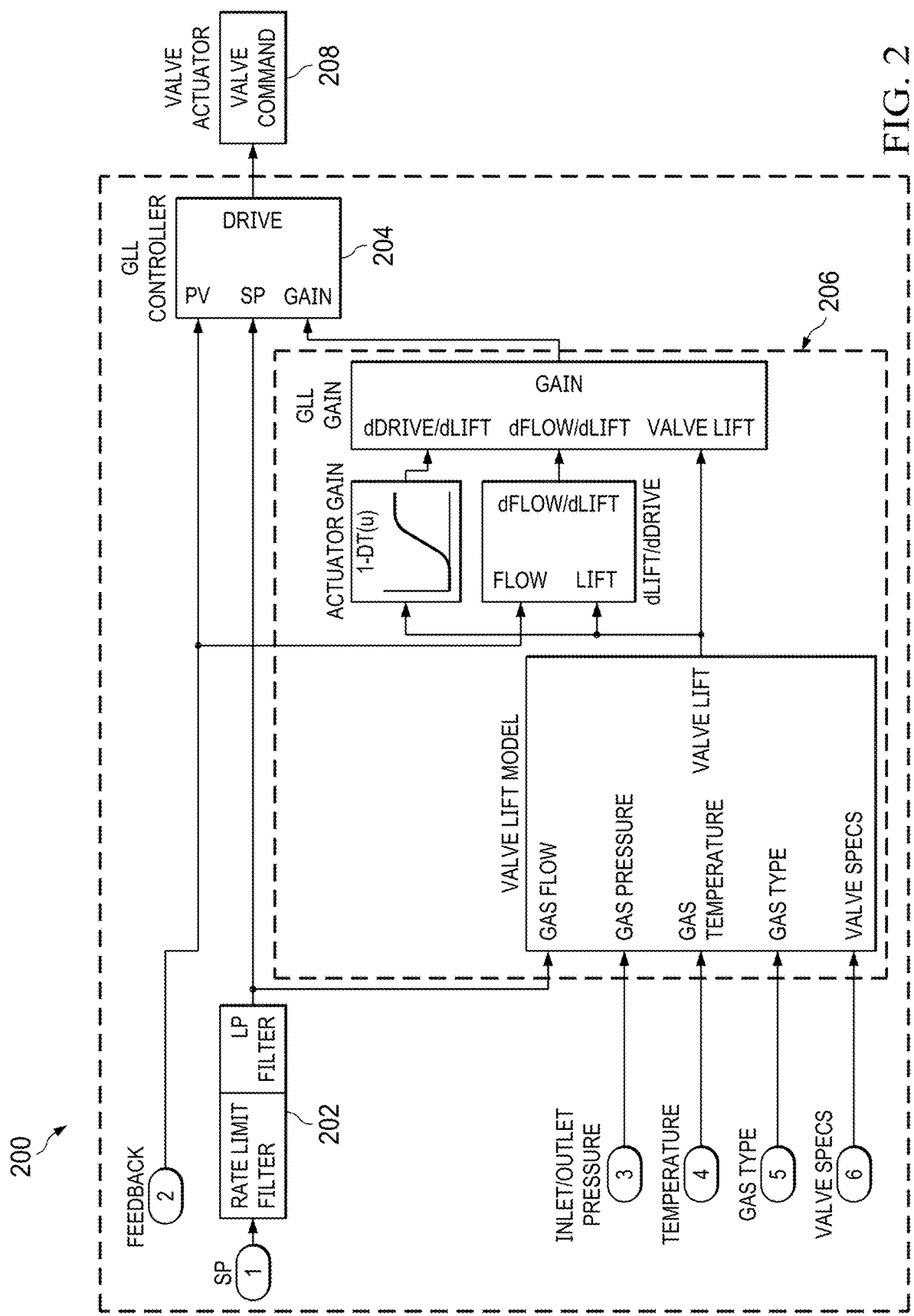
FIG. 2 is an illustration of a controller system for controlling the linear response of a control valve of the MFC, in accordance with certain example embodiments.

Referring now to FIG. 2 illustrated is a MFC controller system for controlling the linear response of the control valve 170, according to certain example embodiments, denoted generally as 200. Control system 200 executes a control algorithm that comprises a flow modeling algorithm, a valve modeling algorithm, and a flow control algorithm in order to more accurately control the gain of the MFC 100. Controller system 200 includes a Set Point (SP) filter 202, a Gain-Lead-Lag (GLL) controller 204, and a flow control and modeling system 206. The GLL controller 204 receives SP values and feedback (FB) signals, e.g. pressure or temperature or both, for controlling the response of the valve 170. The flow control and modeling system 206 augments tuning of the GLL controller 204 by further controlling its response according to SP commands, sensor input data, and valve specifications. By filtering set point values prior to processing and using the modeling algorithms during processing, response times of the valve 170 can be more tightly controlled and can be more consistent over a wide range of operating conditions. Furthermore, by properly filtering the set point values prior to processing, the non-linear transient artifacts that effect the valve response time can be eliminated or significantly reduced.

The SP filter 202 filters the received set point (SP) values and sends the filtered values to the GLL controller 204 and the modeling and flow control system 206. The SP values can be a fluid flow rate value. The SP filter 202 can include a configurable rate-limiting filter, such a slew-rate limiting filter, and a low-pass filter to ensure that there are no sudden and discontinuous changes to the command change rate. By delaying the set point, processing of the set point data and the measurements is more precise and, therefore, the non-linear transient artifacts can be significantly reduced or eliminated. The GLL controller 204 functions to control the lift of the valve 170 by providing a drive command to the valve actuator 208. The modeling and flow system 206 receives an SP value and real-time measurements for inlet/output pressures values, temperature values, fluid type values. The modeling and flow system 206 can access and process valve specification data and based on determined fluid modeling characteristics and valve specification data can determine the appropriate gain and control the lift of the value 170 accordingly.

Figure 3A:
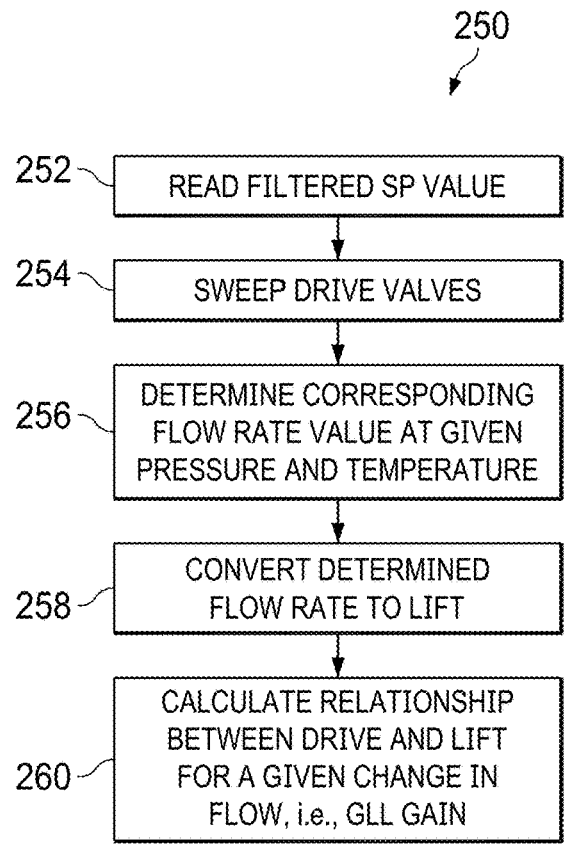
FIG. 3A is an illustration of a valve and fluid flow modeling algorithm of the controller system, in accordance with certain example embodiments.

Referring now to FIG. 3A, illustrated is a valve and fluid flow modeling algorithm, according to certain example embodiments, denoted generally as 250. The algorithm 250 begins at block 252 where a filtered SP value is read. The SP values can be provided by a user or programed into the MFC and adjusted periodically dependent on the use case. At block 254, the drive values for a specific valve are scanned to determine a corresponding flow rate value at a given pressure and temperature. At block 256, the algorithm 250 converts the determined flow rate to a predicted lift value using the available valve specification. At block 258, the relationship between drive and lift for a given change in flow, i.e. the GLL gain, is calculated.

The introduction of the filtered SP value eliminates or significantly reduces overshoot that results in the non-linear transient effects and allows for a more accurate determination of the GLL gain according to pressure and, optionally, other environmental readings. As illustrated in the table below, over a range of filtered set point values and gain calculations for a set of fluid measurement reading no overshoot was detected.

TABLE

Transient Response Time Performance

| SP | OVERSHOOT | DEAD TIME | RESPONSE TIME | SETTLE TIME |
|---|---|---|---|---|
| 0.5 | 0 | 4 | 252 | 252 |
| 1 | 0 | 4 | 250 | 250 |
| 5 | 0 | 4 | 236 | 236 |
| 10 | 0 | 4 | 238 | 238 |
| 25 | 0 | 4 | 236 | 236 |
| 50 | 0 | 4 | 258 | 258 |
| 75 | 0 | 4 | 258 | 258 |

The GLL gain can be defined as the reciprocal of plant gain. Plant gain can be defined as the derivative of a feedback control signal indicating fluid flow with respect to the output of the GLL controller, i.e. the drive. By properly filtering the set point value and setting the GLL gain equal to the reciprocal of the plant gain, a constant loop gain can be achieved. As such, a consistent valve response time across a wide range of operating conditions, e.g. gas, temperature, inlet and outlet pressure, and flow rate, can be achieved.

The GLL gain can be expressed as dDrive/dFlow, i.e. the change in drive is a function of the change in flow, and, as such, the proper relationship between drive and flow can be determined in order to more accurately control the response time of the valve. In general, if g(x) is the predicted lift from the valve model as a function of fluid flow (SCCM), f(x) the controller drive (fraction of full scale drive), and Y is the controller drive as a function of flow, Y=f(g(x)). The GLL gain can be determined using dY/dx=f'(g(x))g'(x), i.e. dDrive/dFlow, where f'(g(x)) is the actuator gain, i.e. dDrive/dLift, and g'(x) is the valve model gain, i.e. dLift/Dflow. The actuator gain f'(g(x)) is the derivative of drive with respect to predicted lift. A valve characterization process can be used to obtain drive vs. predicted lift curve. The derivative of drive vs. predicted lift can be calculated to generate the actuator gain curve. The curve can be represented in the device in any form, e.g. $n^{th}$ order polynomial, piecewise-linear function, spline, etc. The valve model gain g'(x) is a finite difference calculation of the derivative of predicted lift with respect to flow around the current operating conditions. This is with the error between flow and controller set point approaching 0. Depending on the valve model used, it is possible to directly differentiate the equations involved and can be expressed as a closed-form derivative. Either implementation, finite difference calculation or closed form) can work equally well.

Figure 3B:
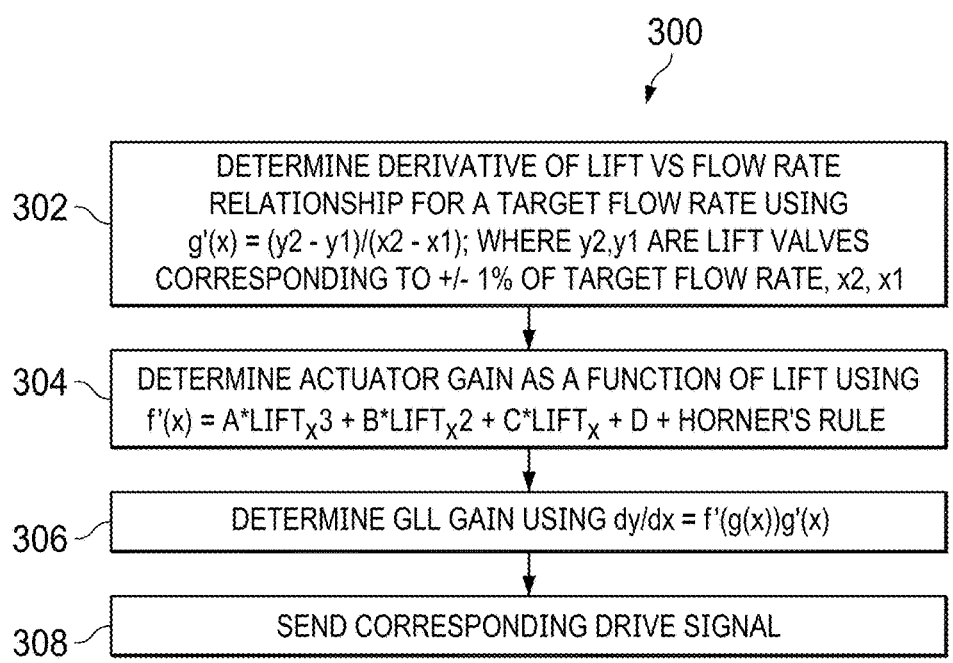
FIG. 3B is an illustration of a fluid flow control algorithm of the controller system, according to certain example embodiments.

Referring now to FIG. 3B, illustrated is a fluid flow control algorithm, according to certain example embodiments, denoted generally as 300. Although the algorithmic methods provided below for determining the GLL gain are effective, it should be understood that other methods of calculating the GLL gain can be used. This is simply one way in which the GLL gain can be determined. The fluid flow control algorithm calculates the relationship between the drive value and lift for a given change in flow. The algorithm begins at block 302 where the lift versus flow rate relationship for a flow rate is determined using equation 1:

$$g'(x)=(Y2-Y1)/(X2-X1) \quad \text{(Eq. 1); and}$$

where Y1, Y2 are lift values corresponding to +/−1%, or approximately +/−1%, of flow rates X1, X2. X1 and X2 or the difference thereof define the change in flow rate obtained from set point values and actual flow rate measurements. The lift values can be retrieved from the valve specifications stored in memory. At block 304, the algorithm 300 determines the actuator gain as a function of lift using equation 2:

$$f'(g(x))=A*\text{lift}_x^3+B*\text{lift}_x^2+C*\text{lift}_x+D \quad \text{(Eq. 2); and}$$

Horner's rule. The coefficients of the derivatives can be stored in and retrieved from memory. At block 306, the algorithm 300 determines the GLL gain using equation 3:

$$dY/dx=f'(g(x))g'(x) \quad \text{(Eq. 3);}$$

The corresponding drive signal value is then sent to the GLL controller 204 in order to control the valve actuator 208.

The GLL gain units can be expressed in fractionalDrive/fractionalFlow. For actual GLL gain calculations, the units used can be expressed as Drive(Volts)/Flow (SCCM—Standard Cubic Centimeters per Minute). A reason for such expression can be to change drive full scale range of the device after characterization or changing configured full scale range of the device after characterization. The algorithms can execute the necessary conversions of GLL gain value from Drive(Volts)/Flow(SCCM) to fractionalDrive/fractionalFlow before the GLL gain values are used. However, the GLL gain units can be expressed in the units GLL controller 204 is configured to operate.

Figure 4A:
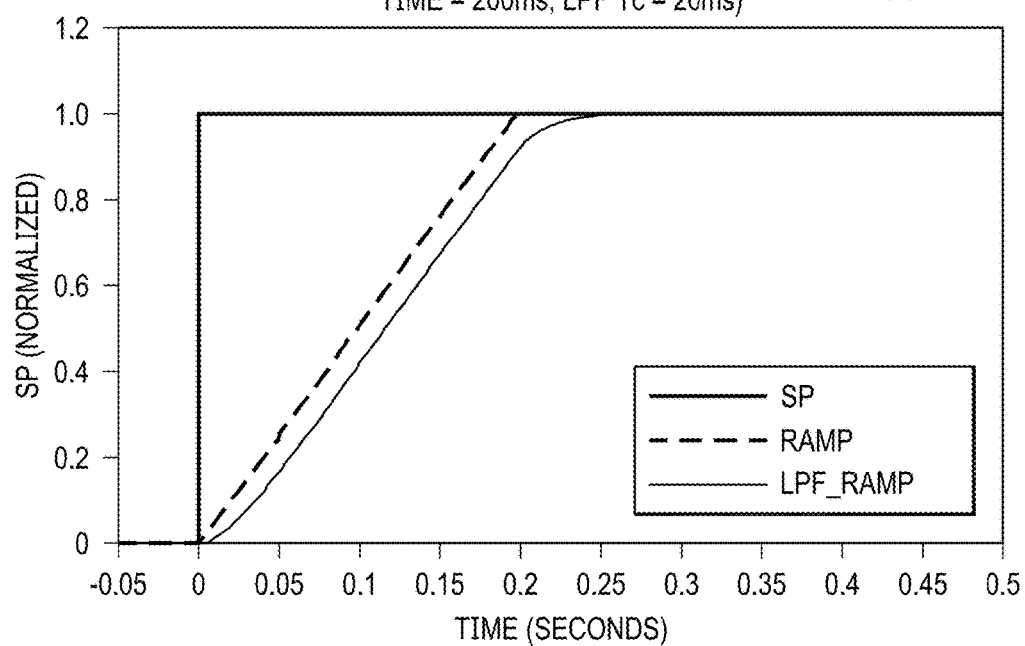
FIG. 4A is an illustration of a control command filtering ramp signal after it has passed through a filtering process of the controller system, in accordance with certain example embodiments.
Figure 4B:
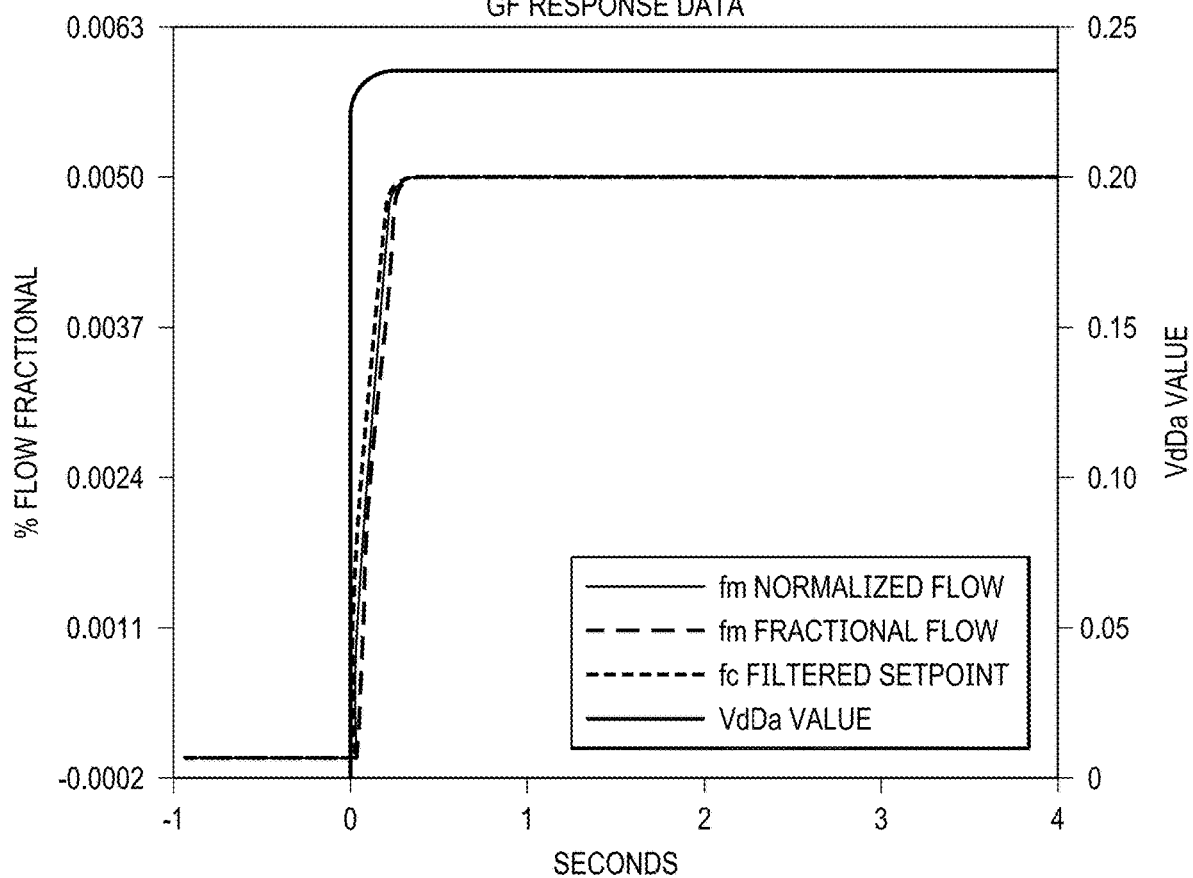
FIG. 4B is an illustration of a performance graph demonstrating precision process control of a filtered set point value in relation to relevant process signals, in accordance with certain example embodiments.

In FIG. 4A, illustrated is an example of a set value command before and after filtering at filter 202. The trace depicted as "lpf ramp" illustrates a combined ramp signal after passing through the rate limiting and low-pass filter. In this case, the ramp time of 200 ms combined with the low-pass filter 20 ms time-constant produces an output that is within 98% of the final value in 250 ms. In FIG. 4B, is an example graph demonstrating precision process control of a filtered set point value in relation to a supply voltage and normalized flow, fractional flow, and a filtered SP value. As can be easily discerned, the difference or error between the filtered SP value and flow is minimal and almost non-existent. In FIG. 4C, illustrated is a graph of different response times for a percentage of SP values when the controller system 200 uses no filter 202 and the flow control and modeling system 206 is disabled, when the controller system 200 uses no filter 202 and the flow control and modeling system 206 is enabled, and when the controller system 200 uses filter 202 and the flow control and modeling system 206 is enabled. Without the filter and gain control, response time can be anywhere from 135 ms to 315 ms (180 ms spread) across the set points. Enabling gain control increased consistency by 3 times. Enabling both SP filtering and gain control provides best consistency across set points with a band of +/−10 ms.

Figure 5:
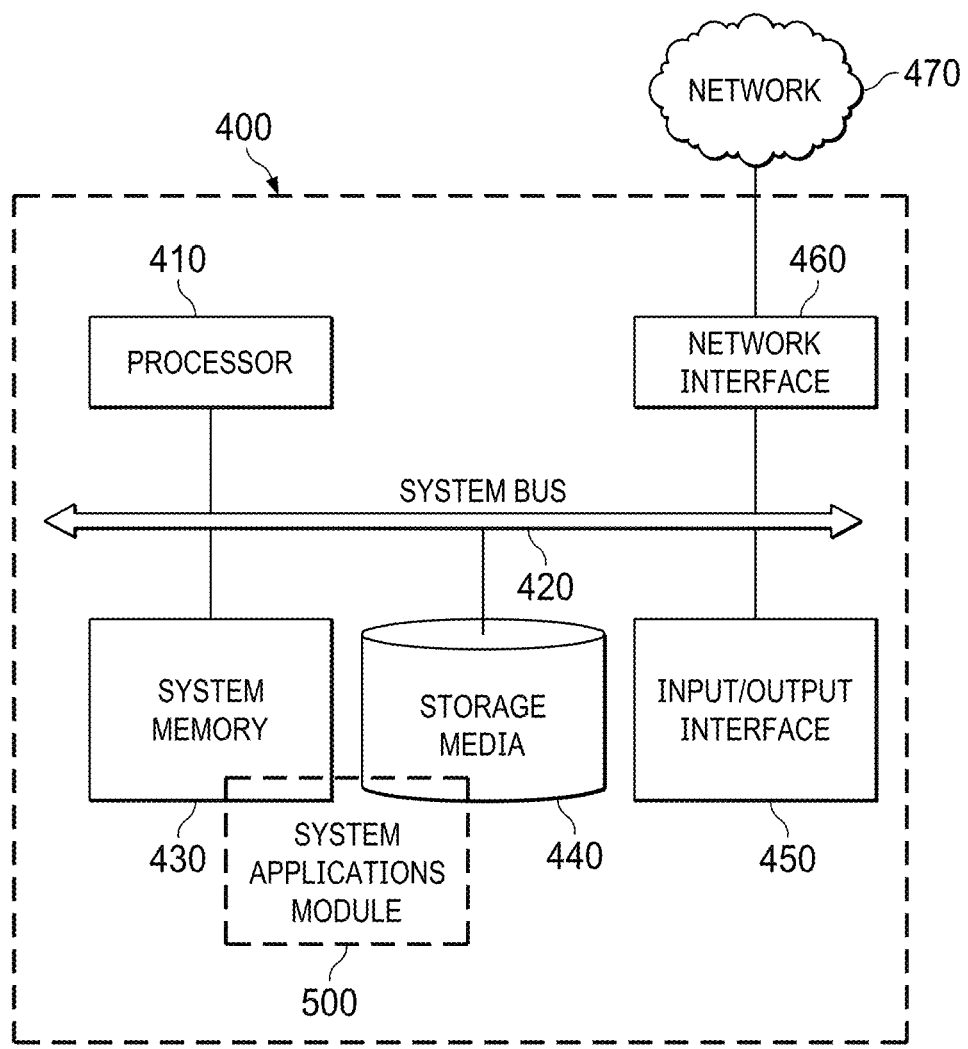
FIG. 5 is a block diagram depicting a computing machine and system applications, in accordance to certain example embodiments.

Referring now to FIG. 5, illustrated is a computing machine 400 and a system applications module 500, in accordance with example embodiments. The computing machine 400 can correspond to any of the various computers, mobile devices, laptop computers, servers, embedded systems, or computing systems presented herein. The module 500 can comprise one or more hardware or software elements, e.g. other OS application and user and kernel space applications, designed to facilitate the computing machine 400 in performing the various methods and processing functions presented herein. The computing machine 400 can include various internal or attached components such as a processor 410, system bus 420, system memory 430, storage media 440, input/output interface 450, a network interface 460 for communicating with a network 470, e.g. cellular/GPS, Bluetooth, or WIFI.

The computing machines can be implemented as a conventional computer system, an embedded controller, a laptop, a server, a mobile device, a smartphone, a wearable computer, a customized machine, any other hardware platform, or any combination or multiplicity thereof. The computing machines can be a distributed system configured to function using multiple computing machines interconnected via a data network or bus system.

The processor 410 can be designed to execute code instructions in order to perform the operations and functionality described herein, manage request flow and address mappings, and to perform calculations and generate commands. The processor 410 can be configured to monitor and control the operation of the components in the computing machines. The processor 410 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 410 can be a single processing unit, multiple processing units, a single processing core, multiple processing cores, special purpose processing cores, co-processors, or any combination thereof. According to certain embodiments, the processor 410 along with other components of the computing machine 400 can be a software based or hardware based virtualized computing machine executing within one or more other computing machines.

The system memory 430 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 430 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 430. The system memory 430 can be implemented using a single memory module or multiple memory modules. While the system memory 430 is depicted as being part of the computing machine, one skilled in the art will recognize that the system memory 430 can be separate from the computing machine 400 without departing from the scope of the subject technology. It should also be appreciated that the system memory 430 can include, or operate in conjunction with, a non-volatile storage device such as the storage media 440.

The storage media 440 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 440 can store one or more operating systems, application programs and program modules, data, or any other information. The storage media 440 can be part of, or connected to, the computing machine. The storage media 440 can also be part of one or more other computing machines that are in communication with the computing machine such as servers, database servers, cloud storage, network attached storage, and so forth.

The applications module 500 and other OS application modules can comprise one or more hardware or software elements configured to facilitate the computing machine with performing the various methods and processing functions presented herein. The applications module 500 and other OS application modules can include one or more algorithms or sequences of instructions stored as software or firmware in association with the system memory 430, the storage media 440 or both. The storage media 440 can therefore represent examples of machine or computer readable media on which instructions or code can be stored for execution by the processor 410. Machine or computer readable media can generally refer to any medium or media used to provide instructions to the processor 410. Such machine or computer readable media associated with the applications module 500 and other OS application modules can comprise a computer software product. It should be appreciated that a computer software product comprising the applications module 500 and other OS application modules can also be associated with one or more processes or methods for delivering the applications module 500 and other OS application modules to the computing machine via a network, any signal-bearing medium, or any other communication or delivery technology. The applications module 500 and other OS application modules can also comprise hardware circuits or information for configuring hardware circuits such as microcode or configuration information for an FPGA or other PLD. In one exemplary embodiment, applications module 500 and other OS application modules can include algorithms capable of performing the functional operations described by the flow charts and computer systems presented herein.

The input/output ("I/O") interface 450 can be configured to couple to one or more external devices, to receive data from the one or more external devices, and to send data to the one or more external devices. Such external devices along with the various internal devices can also be known as peripheral devices. The I/O interface 450 can include both electrical and physical connections for coupling the various peripheral devices to the computing machine or the processor 410. The I/O interface 450 can be configured to communicate data, addresses, and control signals between the peripheral devices, the computing machine, or the processor 410. The I/O interface 450 can be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 450 can be configured to implement only one interface or bus technology. Alternatively, the I/O interface 450 can be configured to implement multiple interfaces or bus technologies. The I/O interface 450 can be configured as part of, all of, or to operate in conjunction with, the system bus 420. The I/O interface 450 can include one or more buffers for buffering transmissions between one or more external devices, internal devices, the computing machine, or the processor 420.

The I/O interface 420 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 420 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 400 can operate in a networked environment using logical connections through the NIC 460 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 410 can be connected to the other elements of the computing machine or the various peripherals discussed herein through the system bus 420. It should be appreciated that the system bus 420 can be within the processor 410, outside the processor 410, or both. According to some embodiments, any of the processors 410, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A valve control system for controlling operation of a valve, the valve control system comprising:
   a gain controller for sending a drive value to a valve actuator to control linear response time of a valve;
   a linearization control system coupled with the gain controller to determine a gain value to control the linear response time of the valve; and
   a set point filter coupled to the linearization control system to filter a set point value;
   wherein the linearization control system determines at least one controller gain parameter using: a model of the valve to estimate valve position from the filtered set point value, operating conditions, and fluid properties; a model of the valve actuator to calculate the derivative of valve drive with respect to valve position as a function of the estimated valve position; and a flow control model to calculate the derivative of valve position with respect to flow corresponding to the estimated valve position and a real-time flow rate, operating conditions, and fluid properties.

2. The valve control system of claim 1 wherein the set point filter includes a slew-rate limiting filter.

3. The valve control system of claim 2 wherein the set point filter includes a low pass filter.

4. The valve control system of claim 1 wherein the the fluid properties comprises at least two selected from a group comprising fluid pressure, fluid type, flow rate, and fluid temperature.

5. The valve control system of claim 1 wherein the gain value is defined by $dY/dx - f'(g(x))g'(x)$, where Y is controller drive, $f'(g(x))$ is actuator gain, and $g'(x)$ is the valve model gain, wherein x is the flow rate.

6. The valve control system of claim 1 wherein the linear response time is less than 300 ms and an output response is within 98% of the set point value.

7. A method for controlling operation of a valve, the method comprising:

sending, at a gain controller, a drive value to a valve actuator to control linear response time of the valve;

determining, at a linearization control system coupled with the gain controller, a gain value to control the linear response time of the valve; and filtering, at a set point filter coupled to the linearization control system, a set point value;

wherein the linearization control system determines at least one controller gain parameter using: a model of the valve to estimate valve position from the filtered set point value, operating conditions, and fluid properties; a model of the valve actuator to calculate the derivative of valve drive with respect to valve position as a function of the estimated valve position; and a flow control model to calculate the derivative of value position with respect to flow corresponding to the estimated valve position and a real-time flow rate, operating conditions, and fluid properties.

8. The method of claim 7 wherein the set point filter includes a slew-rate limiting filter.

9. The method of claim 8 wherein the set point filter includes a low pass filter.

10. The method of claim 7 wherein the gain value is defined by $dY/dx=f'(g(x))g'(x)$, where Y is controller drive, $f'(g(x))$ is actuator gain, and $g'(x)$ is the valve model gain, wherein x is the flow rate.

11. The method of claim 7 wherein the gain is determined from the filtered set point value, the fluid properties, and a valve specification.

12. The method of claim 7 wherein the linear response time is less than 300 ms and an output response is within 98% of the set point value.

13. The method of claim 7 wherein the gain value is equal to the reciprocal of a feedback signal indicating fluid flow and an output of the gain controller.

14. A control system for controlling valve response time of a valve based system, the control system comprising:

a feedback control system coupled to an actuator of the valve based system to determine a gain value to control the linear response time of a valve; and a set point filter coupled to the feedback control system to filter a set point value;

wherein the feedback control system determines at least one controller gain parameter using: a model of the valve to estimate valve position from the filtered set point value, operating conditions, and fluid properties; a model of the valve actuator to calculate the derivative of valve drive with respect to valve position as a function of the estimated valve position; and a flow control model to calculate the derivative of valve position with respect to flow corresponding to the estimated valve position and a real-time flow rate, operating conditions, and fluid properties.

15. The control system of claim 14 wherein the set point filter includes a slew-rate limiting filter.

16. The control system of claim 15 wherein the set point filter includes a low pass filter.

17. The control system of claim 14 wherein the the fluid properties comprises at least two selected from a group comprising fluid pressure, fluid type, and fluid temperature.

18. The control system of claim 14 wherein the gain value is defined by $DY/dx=f'(g(x))g'(x)$, where Y is controller drive, $f'(g(x))$ is actuator gain, and $g'(x)$ is the valve model gain, wherein x is the flow rate.

19. The control system of claim 14 wherein the gain is equal to the reciprocal of a feedback signal indicating fluid flow and an output of the gain controller.

* * * * *